(No Model.)
S. C. COBB.
CULTIVATOR.
No. 555,760. Patented Mar. 3, 1896.
Fig. 1.
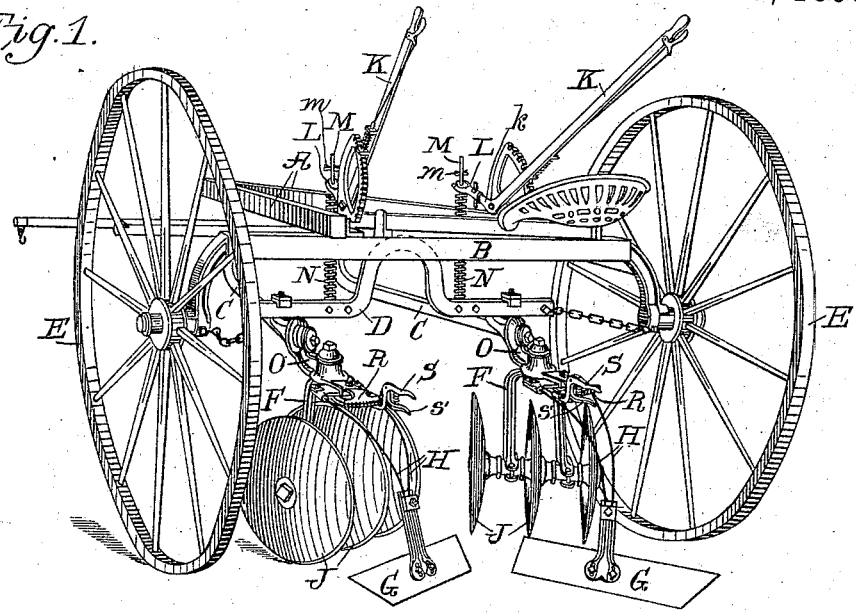
Fig. 2.
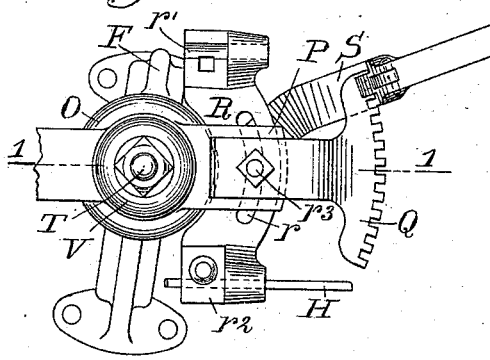
Fig. 4.
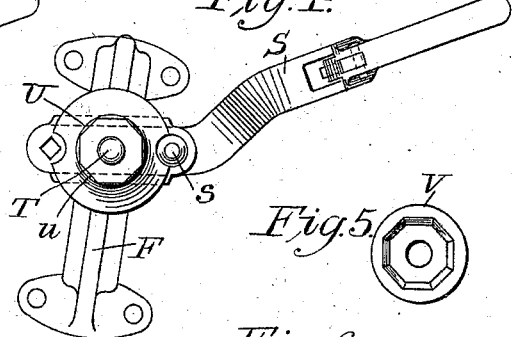
Fig. 5.
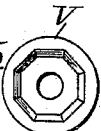
Fig. 3.
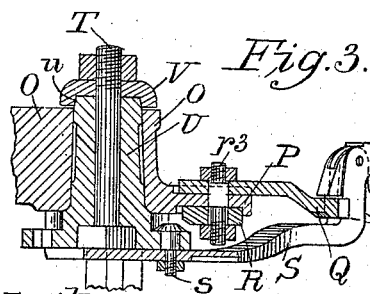
Fig. 6.
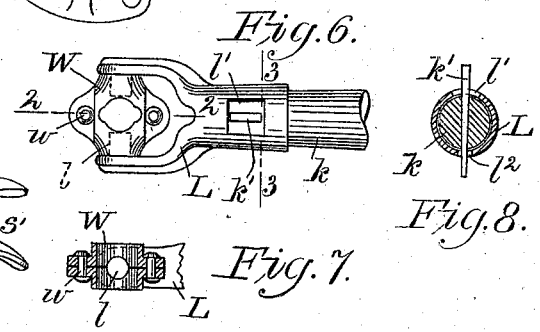
Fig. 8.
Fig. 7.
Witnesses:
John W. Fisher
Walter Melius
Inventor,
Samuel C. Cobb.
by Robert W. Hardie
Attorney.

UNITED STATES PATENT OFFICE.

SAMUEL CHAMBERLAIN COBB, OF JANESVILLE, WISCONSIN.

CULTIVATOR.

SPECIFICATION forming part of Letters Patent No. 555,760, dated March 3, 1896.

Application filed April 2, 1895. Serial No. 544,217. (No model.)

*To all whom it may concern:*

Be it known that I, SAMUEL CHAMBERLAIN COBB, a citizen of the United States, residing at Janesville, in the county of Rock and State of Wisconsin, have invented certain new and useful Improvements in Cultivators; and I do hereby declare the following to be a full, clear, and exact description of the invention, such as will enable others skilled in the art to which it appertains to make and use the same.

My invention has for its objects, first, to provide means for quickly adjusting the angle of the gangs of such a cultivator to suit the different conditions of the soil without stopping the team; second, to attach a leveling-blade to a cultivator, so that its position and adjustment may be maintained independently of the adjustment of the angle of the gangs, and thereby maintain a uniform position at any angle of inclination of the disks; third, to provide the lifting-lever of a cultivator with flexible connections with the gang-beams, so as to enable one of the gangs or one side of a swinging frame to be lifted and adjusted freely independently of the opposite gang. These objects I accomplish by the means illustrated in the accompanying drawings, in which—

Figure 1 is a rear perspective view of a cultivator embodying my invention. Fig. 2 is a plan view of means for adjusting the angle of the gangs and a support for a leveling-blade. Fig. 3 is a vertical cross-section taken on line 1 1 of Fig. 2. Fig. 4 is a plan view of the gang-yoke and lever. Fig. 5 is a plan view of the under side of a nut for the spindle of gang-yoke. Fig. 6 is a plan view of a swiveling yoke on arm of lifting-lever and socket-head for lifting-rod. Fig. 7 is a vertical section of socket-head, taken on line 2 2 of Fig. 6. Fig. 8 is a vertical cross-section of sleeve of swiveling yoke and arm of lifting-lever, taken on line 3 3 of Fig. 6.

As illustrated in the drawings, the main frame of the cultivator consists of the draft-beams A, secured to an axle-bar B, which is mounted on driving-wheels E. Gang-beams C are flexibly connected at their forward ends to the main frame in any suitable manner, so as to permit vertical and lateral movement of said gang-beams. The gang-beams are secured at any desired distance apart at their rear ends by means of the brace-bar D. The rear ends of the gang-beams C are provided with brackets O, which support a yoke F, upon the lower ends of which are mounted gangs of revolving cutters J. The yoke F is provided with a vertical pivot U, (shown in Fig. 3,) which permits lateral movement of the yoke and gangs for adjusting the gangs at the desired angle to line of draft. A lever S is secured to the upper portion of the yoke F, and is provided with a spring-latch S', which engages a notched segment Q, fixed to a rear extension P of the bracket O. A plate R is also preferably secured to said extension P of the bracket O, and is provided with a curved slot $r$ to permit of lateral adjustment of said plate. Horizontal grooves $r'$ are formed in the ends of the plate R, which, by means of a clip $r^2$, secure the upper ends of the standards H, which support the leveling-blade G.

The lower ends of the lifting-levers K are provided with short arms $k$, which engage the sleeve of the yoke L, having openings $l'$ and $l^2$ opposite each other, the upper one, $l'$, considerably wider than the other. A pin $k'$ extends through said openings and through the arm $k$ of the lifting-lever, so as to permit a rocking lateral movement of the sleeve on said arm.

The arms of the yoke L pivotally support a socket-head W, which rocks vertically in its bearings on the ends of said arms of the yoke L, and supports the upper ends of a lifting-rod M, which is secured by a spring-key $m$ to said socket-head. By means of said lateral movement of the yoke L on the arm $k$ of the lever and the vertical movement of the socket-head W the lifting-rod M is free to swing in any direction, and one of the gangs supported by the lower end of said rod may thereby be freely elevated without disturbing the position of the adjacent gang.

When the cultivator is in operation the position of the leveling-blade G is not disturbed by changing the angle of the gangs of cutters, for the reason that the standards H, supporting the leveling-blade G, are not secured to the said gangs, but to the bracket O. The angle of the gangs may be instantly changed when the team is in motion and the disks in use by means of the lever S, and be secured by the notched segment Q and spring-latch s', and this may be readily accomplished in whatever position the gangs may be arranged, or with any construction of a gang of revolving cutters mounted on a bar or swinging frame.

What I claim is—

1. In a cultivator, the combination with a main frame, of an auxiliary swinging frame, gangs of revolving cutters pivoted to said swinging frame, and a leveling-blade secured to said swinging frame independently of said disk-gangs, substantially as shown and described.

2. In a cultivator, the combination with a main frame, of an auxiliary frame provided with gangs of revolving cutters pivoted to said auxiliary frame, a leveling-blade mounted upon a flexible standard, and a plate securing the upper end of such standard and movable bodily laterally, substantially as shown and described.

3. In a cultivator, the combination with a main frame, of an auxiliary frame, gangs of revolving cutters pivoted to said auxiliary frame, a leveling-blade, and a spring-standard secured at its lower end to the leveling-blade and at the upper end to a plate having both a pivotal movement and a bodily lateral movement, substantially as shown and described.

4. In a cultivator, the combination with a swinging gang-beam, of a yoke pivoted at the rear of said beam, a lever secured at its forward end to said yoke and provided with an offset handle, a latch arranged between said lever and handle, and a notched segment engaging said latch, substantially as shown and described.

5. In a cultivator, the combination with an auxiliary frame movable vertically and laterally independently of a main frame, of a gang of revolving cutters having a vertical pivot engaging said auxiliary frame, and a washer secured to and movable with the upper part of said pivot, substantially as shown and described.

6. In a cultivator, the combination with a main frame, of a swinging frame, a lever mounted on the main frame, a lifting-rod, and a joint between said lever and lifting-rod having a positive vertical and lateral adjustment, substantially as shown and described.

7. In a cultivator, the combination with a main frame, of a swinging frame, a lever mounted on the main frame, a lifting-rod, a yoke provided with a sleeve having a rocking movement on said lever, and a socket-head having vertical movement pivoted to said yoke, substantially as shown and described.

In testimony whereof I affix my signature in presence of two witnesses.

SAMUEL CHAMBERLAIN COBB.

Witnesses:
JOHN V. NORCROSS,
WM. RUGER.